March 6, 1934. J. DE LA CIERVA 1,949,785
AIRCRAFT HAVING FREELY ROTATIVE WINGS
Filed April 24, 1931 4 Sheets-Sheet 1
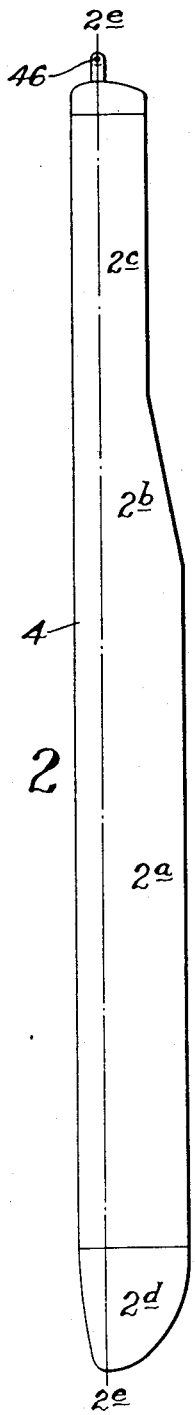
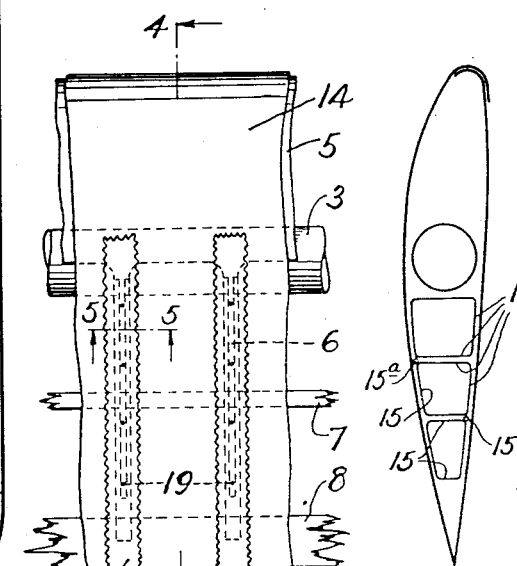
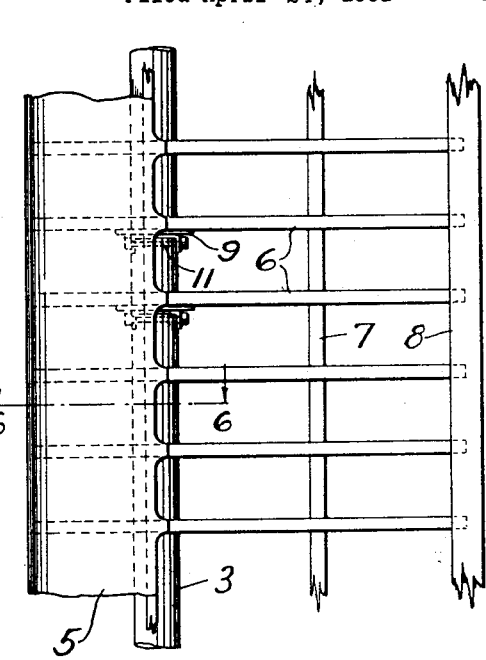
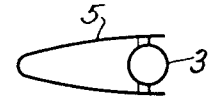
Fig. 6
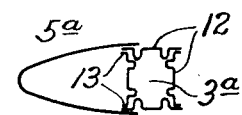
Fig. 7
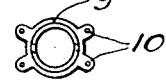
Fig. 8
Fig. 2
Fig. 1 Fig. 3 Fig. 4 Fig. 5
INVENTOR
Juan de la Cierva
BY
ATTORNEYS

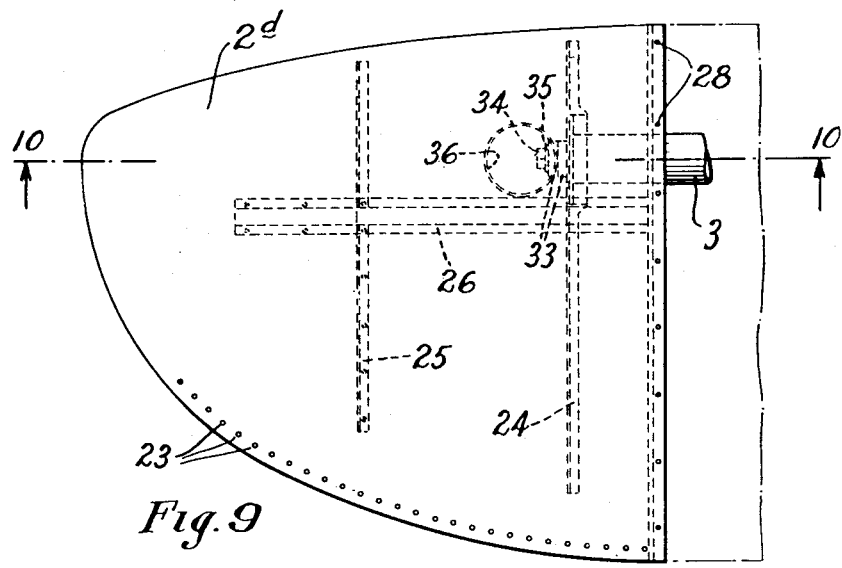
Fig. 9
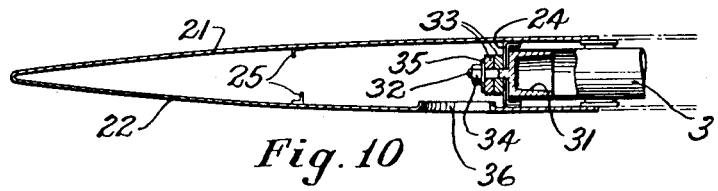
Fig. 10
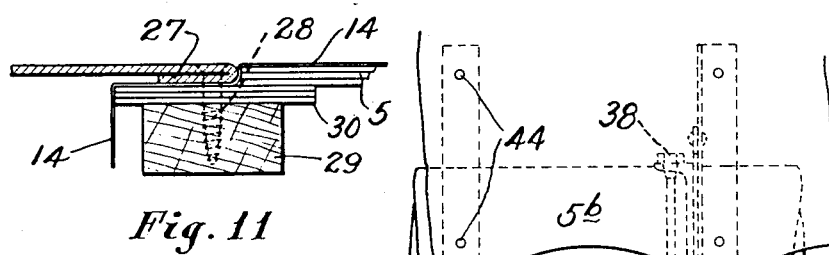
Fig. 11
Fig. 13
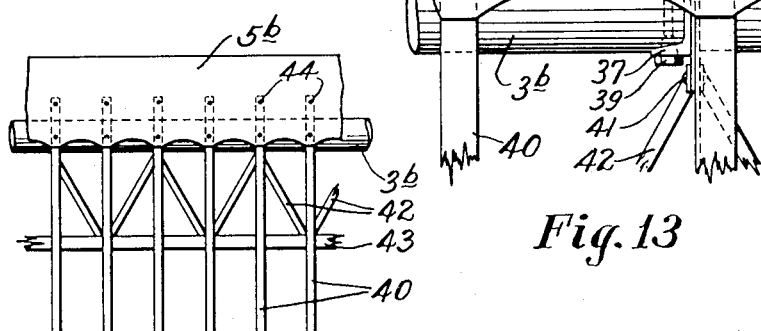
Fig. 12

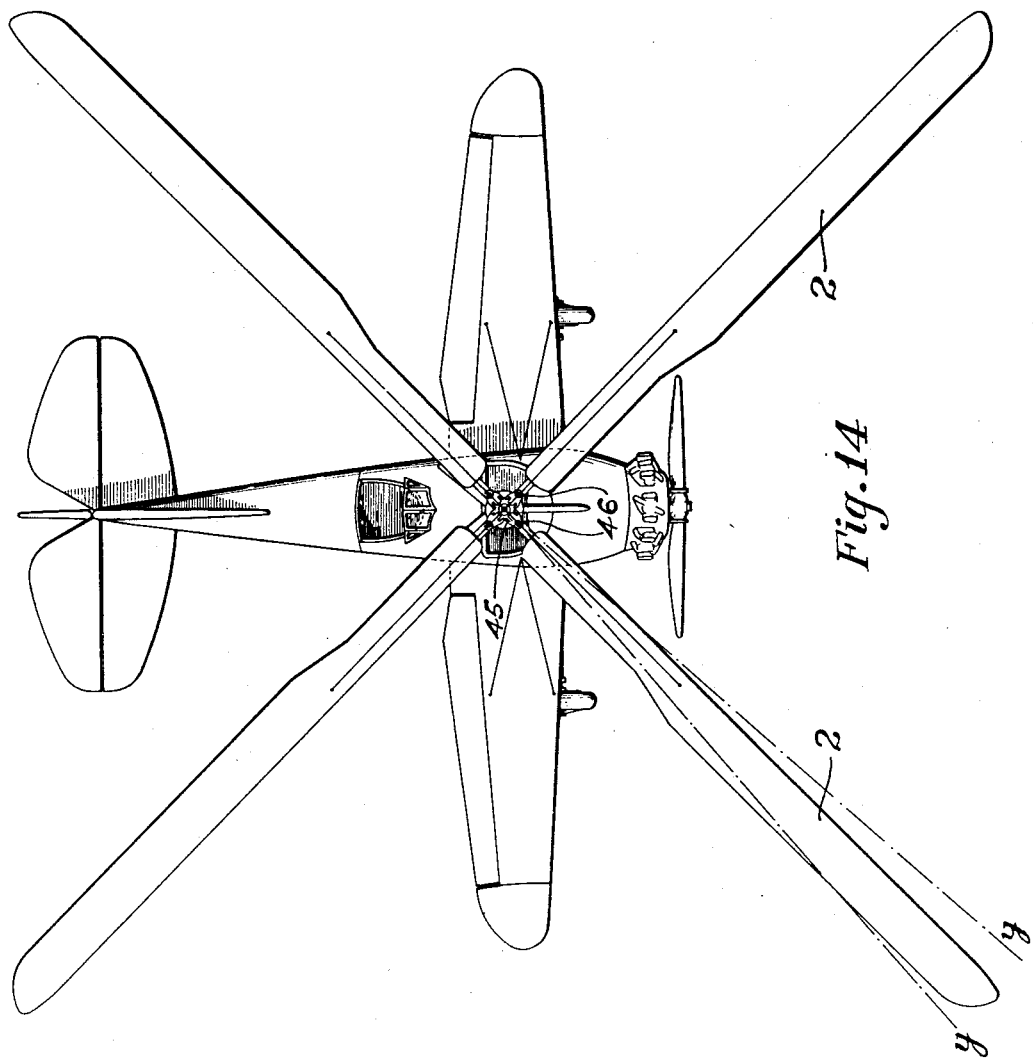

March 6, 1934.  J. DE LA CIERVA  1,949,785
AIRCRAFT HAVING FREELY ROTATIVE WINGS
Filed April 24, 1931   4 Sheets-Sheet 4

INVENTOR
Juan de la Cierva
BY
ATTORNEYS

Patented Mar. 6, 1934

1,949,785

UNITED STATES PATENT OFFICE 1,949,785

AIRCRAFT HAVING FREELY ROTATIVE WINGS

Juan de la Cierva, Madrid, Spain, assignor to Autogiro Company of America, Philadelphia, Pa., a corporation of Delaware Application April 24, 1931, Serial No. 532,603
In Great Britain April 29, 1930

24 Claims. (Cl. 170—159)

This invention relates to aircraft having freely rotative wings, normally rotated in flight by the relative air-flow acting thereon, and more particularly to improvements in the construction and operation of the freely rotative wings themselves. It is especially concerned with aircraft of the air-driven-wing type in which a plurality of the wings or blades adapted to be actuated by the relative air-flow are independently hinged, at their roots to a central rotative hub or axis member or otherwise displaceably arranged in such manner that each wing is free to swing or be displaced (under the action of air and other forces) relatively to the central hub or axis and independently of the other blades in planes containing and perpendicular to the rotative axis but is restrained as against rotating bodily about its own longitudinal axis.

One of the primary objects of the present invention is to provide a wing (forming one of a plurality of such wings adapted to be rotated by the flight wind) having improved aerodynamic characteristics over the forms hitherto employed in aircraft of the type referred to.

Another important object of the invention is to provide a wing of improved structural characteristics such as will lead at the same time to a saving in weight of the wing, to a saving in manufacturing cost, and to the attainment of the improved aerodynamic characteristics mentioned above.

Both of the foregoing objects, as well as other objects and advantages of the present invention, will be brought out more clearly by a consideration of the following discussion of, and comparison with, previous developments in this particular art:

In aircraft of the type referred to, rotative wing systems have hitherto been constructed in which each wing, in plan form, has been tapered towards the tip. This taper has ordinarily extended inwards from the tip a distance equal to approximately several times the maximum chord (or transverse plan dimension), an advantage of such tapering being the minimization of "end losses" or detrimental spilling of air from the wing tips.

It has also been the practice to construct such wings with a portion of very narrow chord at the root and extending a distance of approximately one-third to one-half of the total length or radius of the wing from the root, such narrow-chord root-portion having been provided primarily because it was found to overcome or minimize the detrimental effect due to the "stalling" of such root portion when the wing is retreating, or travelling oppositely to the flight direction, in the course of its rotation. Such root portion has also been heretofore joined to, or merged into, the portion of maximum chord by a fairly gradual taper, the portion of maximum chord (between such taper and the tapering tip) being of comparatively small length, for instance equal to about twice the maximum chord, and having its mid-point situated in the outer half of the wing.

The present invention involves decided improvements over such previous constructions, as will now appear:

In the first place, I have determined, and also proved out by tests, that the most effective part of the wing is situated toward the outer half, primarily on account of the greater relative speed thereof through the air, and in spite of the advantage of a long tapering tip, such wing formation has not fully utilized the advantage of the relatively high tip speed, for the taper itself results in a loss of effective surface at such point or zone. The present invention overcomes this disadvantage, as will later appear.

I have, secondly, found that I can overcome or minimize the loss of aerodynamic efficiency resulting from the fact that, at times when the wing in its rotation is not travelling directly either with or against the flight-direction, the air flow across the wing is oblique thereto and the aerofoil section then presented to the relative air-stream by the long tapering portions of the wing is, on account of the taper in plan form, both irregular and variable along the length of the wing.

Further, I have found that structural difficulties involved in wings having long tapering portions can be substantially overcome, such previous wings obviously involving the necessity of using a large variety of ribs and other parts of different sizes and shapes. At least for economic reasons it is desirable to keep the number of such special ribs at a minimum, and to partially attain this in the wing of long taper it has been customary in some cases to space the ribs somewhat far apart (farther apart than is desirable), with the result that in a fabric-covered wing the aerofoil section presented when the relative air-flow is oblique to the wing is distorted (apart altogether from the previously-discussed effect of the taper) owing to the tendency of the fabric to sag, between the ribs, under the influence of air pressure.

In aircraft of the type referred to, each rotative wing in the course of its rotation experiences a fluctuation of aerodynamic pressure, when the whole aircraft is travelling forward, such that the component in the plane of rotation of the resultant aerodynamic force acts more towards the tip of the wing when the latter is advancing in the flight-direction than when it is retreating against the flight-direction, and its intensity also changes. This fluctuation in the point of application and the intensity of aerodynamic force in the plane of rotation sets up a fluctuating bending moment in the wing in the plane of rotation even when such wing is hingedly attached to a central rotative hub as described above, since the inertial centre of the wing is fixed with respect thereto while the point of application of aerodynamic force fluctuates.

I have therefore found it desirable that the stiffness of the wing against flexure in the plane of rotation should be sufficient to ensure that the wing shall have a natural frequency of flexural vibration in this plane which is well above the impressed frequencies, which correspond to the rate of rotation of the wings or to the first harmonic thereof (higher harmonics being ordinarily found of negligible effect, in practice). Some rotative wings, as I have hitherto constructed them, have employed a single longitudinal tubular spar as the main load carrying member, and the part of such a wing lying towards the root and of very narrow chord has depended on such spar for its flexural rigidity. Such wings, under certain conditions, may not have the necessary degree of flexural rigidity referred to above, in the plane of rotation, unless the spar be made of considerable intrinsic stiffness, when, in addition to the undesirable increase of weight, an increase of rigidity will be conferred on the wing in a direction at right angles to the plane of rotation, since a cylindrical tubular spar is equally stiff against flexure in all directions.

Such great rigidity in a plane containing the axis of rotation is undesirable since the combined effect of aerodynamic forces in this plane, and of centrifugal forces, causes bending moments (in this plane) which are to a considerable extent ordinarily relieved by the flexure of the wing. It may be pointed out that the effect of the centrifugal forces is to increase the virtual stiffness of the wing in the direction containing the axis of rotation and experiments have shown that in the case of wings hingedly attached to a central hub so as to be free to swing in a plane containing the rotative axis no undesirable synchronous vibrations are set up by fluctuation of the aerodynamic bending moments in a plane containing the axis of rotation if the natural stiffness of the wing in this plane is kept as small as is consistent with considerations of general robustness, while great rigidity in this plane leads to higher stresses in the material of the spar.

Passing now from the questions of stiffness of the rotative wing in its plane, or, in other words, in the direction of its general path of rotation, the present invention involves further developments which by experimentation have proven to be very important. Tests have now shown that the optimum aerodynamic characteristics in flight are obtained in aircraft of the present type, if the rotative wings have some degree of twist along their length such that the pitch angle (as measured from the plane of rotation to the "no-lift" line of the aerofoil section used) increases from one to two degrees at the root to some three or four degrees at the tip. The average effective incidence of the wing with respect to the no-lift position may thus be arranged to fall within a certain range found to attain certain novel and advantageous results, especially when used in combination with fixed lifting surfaces so set as to modify the load imposed on the rotative wings (this being fully set forth in my co-pending application, Serial No. 500,064, filed December 4th, 1930). On the other hand, for the purpose of imparting an initial rotation to the wings before taking flight (whatever means may be adopted to impart such initial rotation) it is desirable that the wings should have a pitch angle as small as possible throughout their length, or in other words as near as possible to zero incidence. In aircraft of the type referred to, if a variable pitch angle (or twist) be built into the rotative wing, as described above, then, regardless of average effective angle at which the wing is mounted on its hub, there are the consequent drawbacks of increased difficulty in imparting the initial rotation and increased constructional difficulty. The present invention contemplates the attaining of the advantages of a certain pitch "twist" in flight, with as nearly as possible zero pitch at rest.

More specifically, it is therefore a further object of the present invention to provide a rotative wing in aircraft of the type described which will combine the desired aerodynamic characteristics both in full flight and while initial rotation is being imparted thereto prior to flight, and admit of simple construction without built-in twist.

Primarily, according to the present invention, the rotative wing for aircraft of the type referred to comprises one or more main longitudinal members so constructed that the flexural rigidity of the wing is great in the general plane of its chord and relatively small in the plane perpendicular to the chord, consistent with adequate strength to resist centrifugal and torsional loads.

Preferably the flexural rigidity of these members in both the planes defined above is kept substantially constant from the roots to the outer extremities of the said members. The desired characteristics may be attained by the employment of a main spar of fairly small flexural rigidity together with an auxiliary spar joined to the main spar by lattice or similar bracing lying in the general plane of the chord. Alternatively, a main spar of tubular, or of built up, construction may be reinforced in the plane of the chord by a load-carrying skin of rigid sheet material extending from the leading edge back to the spar and rigidly attached to the spar throughout its length so as to form a built up box-girder of flattened D-shape in cross section. In a preferred form of construction the box-girder formed as hereinbefore described is of constant cross-sectional area and profile throughout its length giving to the complete wing a leading edge which is straight for the whole length of the spar.

According to a feature of this invention the plan form of the wing includes a parallel (or straight) portion, the length of which is more than half the total length of the wing and in which the chord dimension is a maximum. This portion preferably extends to within less than two chords' length of the extreme outer tip. The inner portion of the wing is also preferably of parallel plan form and of reduced chord and extends from the root to a distance of not less than a quarter of the wing's total length. It is preferably joined to the maximum-chord parallel portion of the wing by a taper not more than twice the maximum chord dimension in length.

In order to give as smooth a surface as possible to the blade, while retaining the lightness obtainable with a fabric outer skin, the ribs over which the fabric is stretched are spaced more closely than hitherto usual in wings of the freely rotative type, while the ribs themselves are formed with grooves along their length, in their outer surfaces, for the reception of the stringing by which the fabric is attached thereto, holes being provided at intervals in the grooves through which the stringing is passed. The fabric is thus pulled down into the grooves by the stringing. Cover strips of fabric are then preferably doped over the ribs. Thus a perfectly smooth exterior of constant aerofoil section is provided, which is of peculiar importance in an air-rotated wing, as hereinbefore pointed out.

It will be noted that, in order to maintain a good aerofoil section over the narrower or root portion of the blade, the chord of this latter portion will be greater than hitherto usual in view of the constant section, throughout the wing's length, of the part forward of the main spar. As pointed out above, this would tend to give rise to a detrimental effect owing to the "stalling" of this part of the wing when it is "retreating", and a feature of the present invention is the adoption of an aerofoil section for this part of the wing such as possesses the characteristics of a high stalling angle and a "gradual" rather than an "abrupt" stall, that is such a section as does not show a sudden breakdown of air flow at the angle of maximum lift. In general I have found that heavily cambered sections are distinctly superior to the symmetrical sections, which I have previously employed in this root portion of the wing, both in respect of high "stalling angle" and absence of abrupt breakdown of air flow at the "stalling angle". By using such a section for this part of the wing, I avoid the detrimental effect of a somewhat increased chord, and attain certain other advantages hereinafter more fully developed.

According to a further feature of the present invention as applied to aircraft in which the rotative wings are hingedly attached to a rotative hub, the ribs are so located with respect to the spar that the centre of mass of any cross-section of the wing lies behind the centre of aerodynamic pressure at normal angles of incidence. Preferably for the maximum-chord parallel-portion of the wing an aerofoil section is employed having a substantially constant centre of pressure with respect to the chord. The effect of the aforementioned feature is to cause the resultant of the centrifugal forces and the aerodynamical forces, acting at any point of the wing, to include a couple tending to increase the pitch angle, since, owing to its hinged attachment to the rotative hub permitting freedom to swing in a plane containing the axis of rotation, the wing rises in flight above the horizontal position, whereupon the centrifugal forces include components acting perpendicular to the plane of the wing. Further, the section and gauge of the tubular spar of the wing are so chosen as to give the spar a moderate degree of torsional stiffness such that the wing will respond to the above described action tending to increase the pitch angle to a degree sufficient to twist the wing in flight by an amount giving the optimum pitch angle at the tip, viz. three to four degrees, the wing being constructed without any initial twist and set so as to have a very low or nearly neutral pitch angle; for example, of from one to two degrees, along its whole length, in the unloaded condition. Thus the average effective pitch, in flight, may be made to conform to the range involved in the carrying out of the invention of my aforementioned copending application, the matter of the pitch relationship to the no-lift setting relative to a plane perpendicular to the rotational axis being not a part of the present invention per se but being fully set forth and claimed in the said copending application.

My experiments have shown that this represents the best compromise between the requirements of optimum aerodynamic efficiency in flight, ease of imparting initial rotation to the wings prior to flight, and such torsional stiffness of the wing as is desirable on grounds of robustness and maintenance of a certain constant average pitch in flight.

By way of amplification of the foregoing, I wish to emphasize that the change in the average effective pitch incidence of these autorotative surfaces, between a neutral or low positive setting during initiation of rotation, and a higher positive setting or "torsional twist" during flight operation (that is, when the rotor is under normal flight load or turning up at full autorotational speed) is not to be confused with the variations in aerodynamic angle of attack of the wings. The last-mentioned variations in the type of rotor having flappingly-pivoted or oscillatably-mounted wings, such as disclosed in this case, are automatic and irregular variations and are non-uniform as between the several wings, particularly in normal forward or rectilinear flight in any direction; whereas the initial pitch setting, and the increase thereof under flight load, are approximately constant and uniform as to the several wings; such initial pitch or incidence setting being a physical or structural characteristic, and calculated with relation to a plane perpendicular to the axis of rotation.

Hereinafter I have described in more detail the features of the wing structure by which this phase of the invention is carried out, and I claim both the structure and the method of operation. It may be noted that there are other forms of structure for carrying out the method (involving change in the pitch setting of the wings), an improved form of which is disclosed and claimed in my co-pending application No. 698,372 filed November 16th, 1933, in which latter application I have further added a mechanism for controlling and maneuvering the aircraft by means of the rotor itself, which is utilized in cooperative combination with the improved pitch changing mechanism claimed in that case.

According to another feature of the present invention the main spar does not extend outwardly beyond the parallel portion of the maximum chord, the terminal portion of semi-elliptical plan form being constructed as a separate unit. Such unit may conveniently consist of a pair of metal plates, for instance of aluminium, shaped to the plan form of the wing tip and dished to fit the end of the wing proper, the plates being joined along their outer edges by welding, riveting or the like. Such unit may be attached to the end of the wing proper in any convenient manner, an easily detachable mounting being preferable for ease of replacement in the event of damage. The unit thus formed may, if desired, be stiffened by a metal bulkhead lying clear of the end of the spar and attached to the upper and lower plates by welding, riveting or the like. The end of the spar may also project beyond the end of the wing proper and be fitted with adjustable balance weights, access to such weights being gained through a hole formed in one of the metal plates of the end unit, which hole may be covered with a doped patch or be fitted with a sliding door.

Such a form of construction for the rotative wings of aircraft of the type referred to as is described above presents further advantages over the known types of construction besides those described of an aerodynamic nature in that it lends itself most readily to cheapness of production, a minimum of different sizes and shapes of ribs being required. In the construction of the inner narrow chord portion it may be convenient to use a stiff skin for the trailing as well as the leading portion thus dispensing with ribs in this part altogether.

Alternatively, a rotative wing for aircraft of the type referred to may be constructed in accordance with this invention with a stiff skin, either of metal or ply-wood or the like, throughout, such features of the invention as apply to the construction of ribs and attachment thereto of fabric covering being obviously not applicable in such a case, the other aerodynamic and structural features as described, however, being incorporated.

Having rather fully brought out the major purposes and advantages of the invention, I will now proceed to a description of certain constructional embodiments of the invention, by which such advantages and others incident to the invention, may be obtained, and I make reference to the accompanying drawings, in which:

Figure 1 is a plan view of a rotative wing for an aircraft of the nature illustrated in Figures 14 and 15;

Figure 2 shows in plan view a part of the wing shown in Figure 1, with the outer covering removed;

Figure 3 shows, on an enlarged scale, a part of the narrow-chord portion of the wing of Figure 1, with part of the fabric covering in place, and showing the method of attachment of the said fabric covering;

Figure 4 is a diagrammatic view along the line 4—4 of Figure 3 showing the aerofoil-section employed in the root portion of the wing and method of attaching the fabric, other parts being omitted for clearness;

Figure 5 is an enlarged view in section along the line 5—5 of Figure 3;

Figure 6 is a view in section along the line 6—6 of Figure 2, showing the main spar and the nose stiffening;

Figure 7 is a view similar to Figure 6 but showing a modified form of construction embodying a built-up corrugated-strip metal spar;

Figure 8 is a detail view showing a rib attachment clip;

Figure 9 is a plan view of a detachable sheet metal wing tip;

Figure 10 is a view, partly in section and partly in elevation, taken generally along the line 10—10 of Figure 9;

Figure 11 is a detail view showing the attachment of the wing tip;

Figure 12 is a plan view of part of a modified form of rotative wing;

Figure 13 shows in enlarged plan a detail of the construction of the wing shown in Figure 12;

Figure 15:
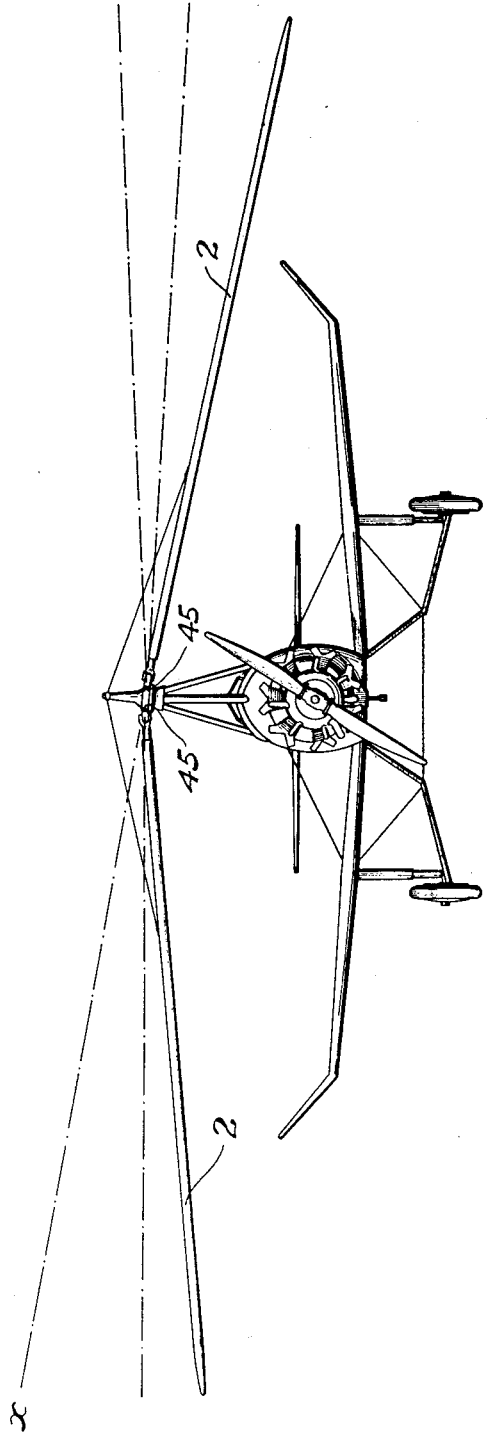

Figure 14 is a plan view of the aircraft as a whole, with a set of the rotative wings hingedly mounted in place, and indicating the pivotal movement, or displaceability, of the individual wings in the general plane of rotation, under the action of flight-forces; and Figure 15 is a front elevation of the craft, indicating the pivotal movement, or changing angular displacement of the individual wings, transversely of the path of rotation, or in planes containing the axis of rotation, under the action of flight forces.

Referring first to Figures 1 to 8, and the general views of Figures 14 and 15, the rotative wing or blade of the present invention, indicated generally by the numeral 2, comprises, in plan form, four parts or areas: 2a, 2b, 2c and 2d; of which 2a and 2c are parallel portions, that is, of substantially constant chord, and 2b is a tapered part joining the parts 2a and 2c. In the area 2a the chord is a maximum, and the chord of part 2c is about two-thirds that of part 2a. The tapered part 2b is of a length, along the axis of the wing, about one and a half times the maximum chord dimension. The rounded tip portion 2d is in length only slightly greater than the maximum chord dimension. Constructionally, the part 2d is preferably formed as a separate unit from the remainder of the wing or blade.

The dot-and-dash line 2e indicates the centre line of a main structural element or spar 3 (see Fig. 2), the leading edge of the wing being indicated at 4, which edge is a straight line throughout the whole length of the wing except in the tip portion 2d. In construction, the wing 2 consists of the main tubular spar 3, a leading edge skin 5, of three-ply wood or other suitable stiff material, ribs 6, a stringer 7 and a trailing edge member 8. The ribs are closely spaced, the spacing being from one-fifth to one-sixth the maximum chord, and are attached by bolts or the like to clips 9 which are provided with lugs or ears 10 for the purpose (see Fig. 8). The clips 9 are threaded on the spar and secured thereto by screwed ferrules or bolts 11. To avoid too much drilling of the spar it may be convenient to secure alternate clips only by means of the ferrules, the intervening clips merely being sweated to the spar.

The leading edge skin 5 is secured in any convenient manner, as by screwing and glueing, to the ribs. Thus the spar, the clips, the part of the ribs covered by the leading edge skin, and the leading edge skin itself, form an intimately bonded structure of compound box-girder type having the shape of a flattened D. The stiffness of this structure in the plane of its plan is far greater than its stiffness in the perpendicular plane which is little more than that of the tubular spar. Fig. 6 shows the cross section of the compound box-girder, the ribs not being shown.

Fig. 7 shows, in a similar view to Fig. 6, an alternative form of construction, in which a built-up box spar 3a, consisting of corrugated rolled metal strips 12 riveted together, has riveted directly thereto at the points 13 a sheet metal leading edge skin 5a. (On account of the small scale of the figure, the rivets themselves are not shown.)

Referring particularly to Figs. 3, 4 and 5, it will be seen that the wing is covered with a fabric covering 14 secured as by stringing 15. In order to preserve a smooth outer surface the stringing 15 is sunk in grooves 16 formed in the flanges 17 of the ribs 6, which are completed by double webs 18 of three-ply wood or other suitable material. The webs 18 are provided with large lightening holes, in known manner so as to form a lattice bracing. The flanges 17 of the ribs 6 are further provided with holes 19 through which the stringing is passed and led from the top to the bottom flange as shown in Fig. 5.

Fig. 4 shows a method of arranging the stringing 15, the other parts not being shown. The stringing passes along the groove in one flange through one of the holes 19, across to the other flange, through a similar hole and along a similar groove, being knotted and secured where necessary (as indicated at 15a). Patches of frayed tape 20 (Figs. 3 and 5) are finally doped over the stringing to give a smooth outer surface.

Fig. 4 also shows the profile of a suitable high-lift aerofoil section for the narrow chord part 2c of the wing.

Referring to Figs. 9, 10 and 11, the detachable wing tip member 2d is made of a single sheet of aluminium or other suitable light metal bent about the leading edge to form upper and lower surfaces 21, 22, whose free edges are joined as by riveting along the trailing edge, as at 23. A transverse stiffener 24, of channel section, is riveted to both upper and lower surfaces which are further stiffened with angle members 25 and longitudinal channel or V-section stiffeners 26.

The edges of the sheets 21, 22, where they join the main part of the wing, are bent over on themselves as at 27 (Fig. 11) and secured by wood-screws 28 to wood strips or blocks 29 forming part of the outermost rib of the main wing structure which is further provided with a flange 30, of three-ply wood or the like, lying immediately under the leading edge skin 5. The fabric covering 14 is carried over the members, 5, 30, as shown in Fig. 11, and the edges 27, of the member 2d, are secured over the fabric. The spar 3 is provided at its end with a plug 31 terminating in a spigot or stud 32 on which are secured balance weights 33 by means of a nut and washer 34, 35. The stud passes through a hole in the channel stiffener 24 and the weights 33 are placed outside the stiffener thus securing stiffener 24 to the end of the spar 3 when the nut 34 is screwed home. This forms an attachment for the member 2d additional to the screws 28.

The end member 24 is also provided with a hole 36 for access to the parts 33, 34, 35. This hole may be provided with a removable patch or cover (not shown).

Figs. 12 and 13 show an alternative form of wing construction adapted to be carried out in metal. To a tubular spar 3b are attached clips 37 by means of screwed bolts or ferrules 38 and nuts 39. To the clips 37 are riveted channel section ribs 40 and the rear rivets 41 at alternate ribs also secure the ends of diagonal bracing members 42, to the other ends of which are secured in any convenient manner a secondary spar 43 which may be of channel or any other suitable section. The rear ends of member 42 may be secured to the webs of the ribs 40, whose flanges are attached to the spar 43. The spars 3b, 43, and diagonal members 42 thus form a triangulated truss of great stiffness in the plane of the wing. A leading edge skin 5b of sheet metal is riveted to the ribs at 44 and further adds to the stiffness in the plane of the wing, while the stiffness of the whole structure in a plane perpendicular to the chord of the wing is not much greater than that of the tubular spar 3b alone.

In both forms of construction described, the major part of the torsional strength and stiffness is provided by the tubular or built-up main spar, which is so proportioned as to permit of the slight twist in flight, hereinbefore described, under the couple produced by the inertial and air-forces particularly when the wings are substantially upwardly swung on their pivots 45 as indicated at $x, x$, in Fig. 15. The relatively shortly tapered tip, which part is, in flight, twisted one or two degrees from the angle at the root end, is thus of great aerodynamical efficiency, as above shown. At the same time, the stiffness in the plane of rotation prevents the inherent period of flexural oscillation of the wing from becoming synchronized with the rotational frequency (or one or more harmonics thereof) as the wings swing on their pivots 46 under the influence of flight forces, as indicate at $y, y$, in Fig. 14. On the other hand, flexibility of the wing in the vertical flapping plane is provided to a considerable degree. In short, the various objects and advantages hereinbefore fully discussed are attained by a construction which is sturdy and reliable in character, albeit relatively simple and inexpensive to manufacture.

What I claim is:—

1. For aircraft employing freely rotative wind-driven wings, an autorotative wing incorporating one or more longitudinal structural members having relatively great flexural rigidity in the plane of the wing chord and relatively small flexural rigidity in the plane perpendicular to the chord, the flexural rigidity of the longitudinal member or members being substantially constant from the root of the wing to the outer extremity of the said member or members, and wing mounting means positioning the wing at an autorotative incidence and constructed to provide freedom for such flexure.

2. For aircraft of the type referred to, an autorotative wing incorporating a single longitudinal spar, and a substantially continuous skin of rigid sheet material forming a double-convex leading edge of the wing and attached firmly to the spar substantially throughout its length, so that the spar and the said rigid leading edge skin together form a built-up box girder the flexural rigidity of which is great in the plane of the wing chord and relatively small in a plane perpendicular to the wing chord, said spar itself being formed as a continuous tubular member, and the spar and skin together thus having a substantially uniform rigidity along the wing's length which is also uniform in either direction perpendicular to the wing chord.

3. For aircraft of the type referred to, an autorotative wing incorporating a single longitudinal spar, and a substantially continuous skin of rigid sheet material forming a blunt-nosed leading edge of the wing, said rigid sheet material being positioned directly on and attached firmly to the spar substantially throughout its length, so that the spar and the said rigid leading edge skin together form a built-up box girder the flexural rigidity of which is great in the plane of the wing chord and relatively small in a plane perpendicular to the wing chord, said spar itself being formed as a built-up box-like member.

4. For aircraft employing freely rotative wind-driven wings, a rotative wing free to flex under the influence of flight throughout at least a major portion of the length thereof incorporating one or more longitudinal structural members so constructed that the flexural rigidity of the wing is great in the plane of its chord and relatively small in the plane perpendicular to the chord, said wing being of a plan form which includes a portion with substantially parallel leading and trailing edges of a length more than half the total length of the wing and in which the chord dimension is a maximum and extending to within a distance of the extreme outer tip of the wing not exceeding twice the maximum chord dimension.

5. For aircraft employing freely rotative wind-driven wings, a rotative wing free to flex under the influence of flight forces throughout at least a major portion of the length thereof incorporating one or more longitudinal structural members so constructed that the flexural rigidity of the wing is great in the plane of its chord and relatively small in the plane perpendicular to the chord, the flexural rigidity of the longitudinal member or members being substantially constant from the root of the wing to the outer extremity of the said member or members, said wing being of a plan form which includes a portion with substantially parallel leading and trailing edges of a length more than half the total length of the wing and in which the chord dimension is a maximum and extending to within a distance of the extreme outer tip of the wing not exceeding twice the maximum chord dimension.

6. For aircraft of the type referred to, an autorotative wing incorporating a single longitudinal spar, and a substantially continuous skin of rigid sheet material forming a rounded-nose leading edge for the wing and attached firmly to the spar substantially throughout its length, so that the spar and the said rigid leading edge skin together form a built-up box girder the flexural rigidity of which is great in the plane of the wing chord and is relatively small and substantially uniform in both the upward and downward directions perpendicular to the wing chord, said wing being of a plan form which includes a substantially parallel portion of a length more than half the total length of the wing and in which the chord dimension is a maximum and extending to within a distance of the extreme outer tip of the wing not exceeding twice the maximum chord dimension.

7. For aircraft of the type referred to, an autorotative wing of a plan form which includes a rounded tip portion, a substantially parallel-edged portion of a length more than half the total length of the wing and in which the chord dimension is a maximum and extending outwardly to merge with said rounded tip portion at a zone which is within a distance of the extreme outer tip of the wing not exceeding twice the maximum chord dimension, and a portion of similarly parallel-edged formation but of reduced chord extending from adjacent the root to at least a quarter of the total wing length, the leading edges of said portions having maximum and reduced chord being in direct alignment, viewed in plan, to provide a straight leading edge from substantially the root end of the wing to the said rounded tip portion.

8. For aircraft of the type referred to, an autorotative wing having an outer portion of substantially fixed-centre-of-pressure section and an inner portion of relatively high-lift unsymmetrically bi-convexly cambered section, said wing being slightly torsionally flexible at least in its outer portion.

9. For aircraft of the type referred to, a rotative wing having an outer portion of substantially fixed-centre-of-pressure section and an inner portion of relatively high-lift section, said wing being slightly torsionally flexible at least in its outer portion, and the mass centre of the section at least in the outer portion being behind the centre of pressure of the section.

10. For an aircraft of the character referred to, a rotative wing of aerofoil contour, of substantially fixed-centre-of-pressure section, and whose outer surface is substantially free from excrescences, particularly transverse ridges, so that the profile of any cross section of the wing taken in any oblique direction between 45° and 90° from the longitudinal axis of the wing is or approximates to a good aerofoil, and the wing further having a fabric covering, and transverse members, to which the fabric is attached, spaced at close intervals not exceeding one fifth of the maximum chord dimension of the wing.

11. For aircraft of the type referred to, a freely rotative wing including a principal longitudinal structural member having pivotal mounting means at the inner end thereof, an auxiliary longitudinal structural member extended along the wing in spaced relation to the principal longitudinal structural member but between the leading and trailing edges of the wing and transverse bracing members attached to said longitudinal members and lying substantially in the plane of the wing chord so as to give great flexural rigidity in that plane, the said auxiliary member and the said transverse bracing members being carried by the principal structural member as against the thrust incident to the action of centrifugal force during rotation of the wing.

12. For aircraft of the type referred to, an autorotative wing having an outer portion with surfaces thereof symmetrically cambered at opposite sides of the wing, and having an inner portion with surfaces asymmetrically cambered at opposite sides of the wing chord, both portions being normally positioned at an autorotational incidence, and the outer portion having a greater incidence in normal flight than the inner portion.

13. For aircraft of the type referred to, an autorotative wing having one portion with surfaces thereof symmetrically cambered at opposite sides of the wing chord, and having another portion with surfaces asymmetrically cambered at opposite sides of the wing chord, both portions being normally positioned at an autorotational incidence.

14. For aircraft of the type referred to, a pivotally or oscillatively mounted air-rotated wing of the character described having slight torsional flexibility and positioned at autorotational incidence, and having the center of gravity of the section of the wing spaced rearwardly of the aerodynamic center of pressure of the section of the wing, at least in an outer portion thereof, a distance sufficient to increase its pitch angle in an outer portion by an amount between one and three degrees by elastic torsional deformation.

15. For an aircraft of the type referred to, an air-rotated wing incorporating a main longitudinal base structure on which the wing is built up, said structure being substantially uniformly and slightly torsionally flexible throughout its length, and wing surfacing built up around said structure, and positioned at autorotational incidence the centre of gravity of the wing being located rearwardly of the aerodynamic centre of pressure, at least in a portion thereof, so that when under load in normal flight the pitch angle is progressively increased toward the tip.

16. For aircraft of the type referred to, an autorotative wing incorporating a single longitudinal spar, and a substantially continuous skin of rigid sheet material forming a double-convex leading edge of the wing and attached firmly to the spar substantially throughout its length, so that the spar and the said rigid leading edge skin together form a built-up box girder, the flexural rigidity of which is great in the plane of the wing and relatively small in a plane perpendicular to the wing chord, the said built-up box girder extending in substantially to the axis of rotation and being of substantially constant cross-sectional profile and area throughout its entire length, the flexural rigidity of the longitudinal structure being substantially constant from the root to the outer extremity thereof.

17. In an aircraft sustaining rotor of the character referred to, an autorotative wing of elongated plan form and constructed to be connected adjacent its inner end to the axis of rotation, said wing at least in an outer portion thereof being of a structure which is externally formed to an aerofoil section the cross sectional form and angle of which produce a lifting reaction, during rotation in flight, the center of pressure of which is located sufficiently forwardly on the wing section as to twist at least the outer portion of the wing in the direction of increasing positive incidence when the wing is turning at flight speed of rotation.

18. In an aircraft sustaining rotor of the character referred to, an autorotative wing of elongated plan form and constructed to be connected adjacent its inner end to the axis of rotation, said wing including two main portions: an inner portion of narrow chord and high-lift section, and an outer portion of wider chord and of relatively low-lift section; the pitch setting of said wing, in flight, being greater in said outer portion than in said inner portion.

19. A normally air actuated rotor comprising a normally freely-rotative rotor axis member and rotative wing means mounted thereon in position to be aerodynamically rotated, said wing means being stiffened to such an extent as to have an inherent vibration period different from the normal range of rotational speeds of the rotor when aerodynamically operated.

20. A normally air actuated rotor comprising a rotor axis member, rotative wing means mounted thereon in position to be aerodynamically rotated, pivot means for so mounting the wing means including a pivot axis which lies in a plane containing the axis of the rotor, said wing means being stiffened in the direction of the general plane of rotation so as to have an inherent vibration period in the plane of rotation substantially different from the entire range of normal rotational speeds of the rotor when aerodynamically operated.

21. A normally air actuated rotor comprising a rotor axis member, rotative wing means mounted thereon in position to be aerodynamically rotated, pivot mechanism for so mounting the wing means including a pivot axis generally transverse the axis of the rotor and another pivot axis set at an angle to the first and to the longitudinal axis of the wing means, said wing means being stiffened in the direction of the general plane of rotation so as to have an inherent vibration period in the plane of rotation which is higher than at least the first harmonic of normal rotational R. P. M. of the rotor when aerodynamically operated, and said wing means having only a fraction of such stiffness in a direction transverse the rotational plane.

22. A normally air actuated rotor comprising a normally freely-rotative rotor axis member and rotative wing means mounted thereon in position to be aerodynamically rotated, said wing means being stiffened to such an extent as to have an inherent vibration period in the direction of their path of rotation higher in frequency than the normal rotational speeds of the rotor when aerodynamically operated.

23. The method of operating an aircraft, having sustaining surfaces rotatably mounted for actuation by relative air flow and swingingly or oscillatably mounted for variation in aerodynamic angle of attack, which includes initiating rotation of said surfaces with the average effective pitch thereof at little or no positive incidence with relation to a plane perpendicular to the axis of rotation, and subsequently continuing the rotation of said surfaces, by effecting a relative translation between the aircraft and the atmosphere, with said surfaces at a greater average effective pitch incidence which is substantially constant and uniform as to the several surfaces in normal rectilinear flight.

24. The method of operating an aircraft having a system of flappingly pivoted and rotatively mounted sustaining blades or wings which method includes the steps of initiating rotation of said system with the blades or wings thereof positioned at a relatively low positive pitch incidence setting with respect to a plane perpendicular to the rotative axis, and effecting rotation of said system for normal flight with at least a portion of the blades or wings thereof positioned at a positive incidence as compared with the incidence setting first mentioned and which is substantially constant and uniform as to the several wings while permitting the usual irregular and non-uniform automatic variations in aerodynamic angle of attack which are incident to said flapping.

JUAN DE LA CIERVA.